United States Patent [19]

Hao

[11] Patent Number: 4,841,188

[45] Date of Patent: Jun. 20, 1989

[54] SPEED CHANGING DEVICE FOR ELECTRIC FANS

[76] Inventor: Chung-Hsing Hao, No. 22-2, Sec. 2, Chang An Rd., Hsi Tun District, Taichung City, Taiwan

[21] Appl. No.: 125,491

[22] Filed: Nov. 25, 1987

[51] Int. Cl.⁴ .............................................. H02K 17/08
[52] U.S. Cl. .................................... 310/200; 310/189; 318/777; 318/817
[58] Field of Search ............... 310/189, 200, 208; 318/772, 773, 774, 775, 776, 777, 816, 817; 417/170 C

[56] References Cited

U.S. PATENT DOCUMENTS 2,310,874  2/1943  Schiff .................................. 318/772
4,486,699  12/1984  Hoemann et al. .................. 318/772

Primary Examiner—Peter S. Wong
Assistant Examiner—D. L. Rebsch
Attorney, Agent, or Firm—Ladas & Parry

[57] ABSTRACT

A speed-changing device for electric ceiling fans includes a run coil for electrical connection to a motor of a ceiling fan, and a starting and speed changing coil, together with a starting capacitor, parallel-connected to the coil. The starting and speed-changing coil includes a set of medium-speed taps and a set of low-speed taps, forming three speed-changing coils, in which speed-changing connections can be switched without producing any noise from the motor, by maintaining the same current direction after switching.

1 Claim, 5 Drawing Sheets

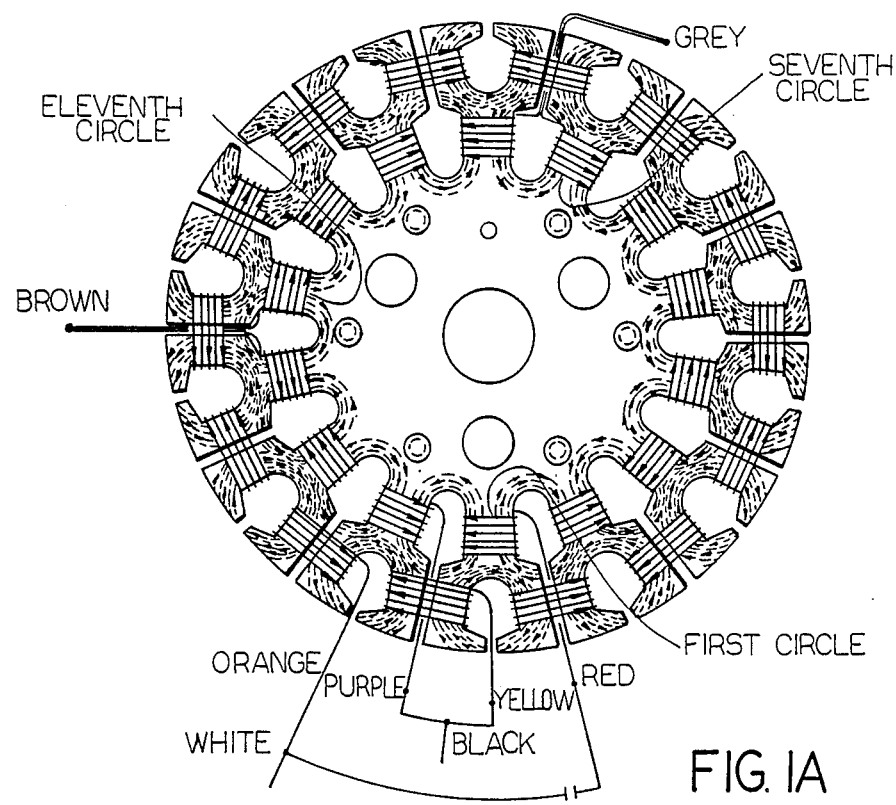
FIG. IA
PRIOR ART
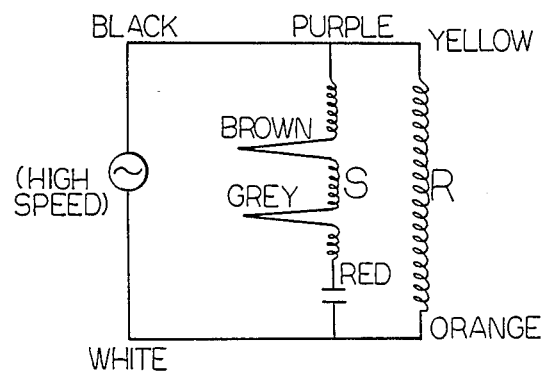
FIG. IB
PRIOR ART

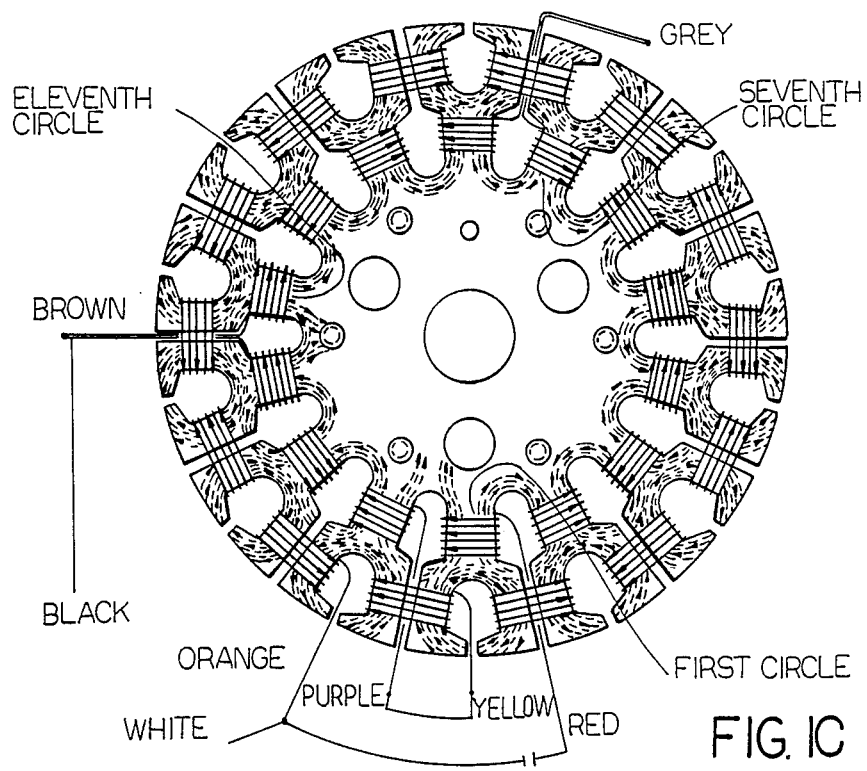
FIG. IC
PRIOR ART
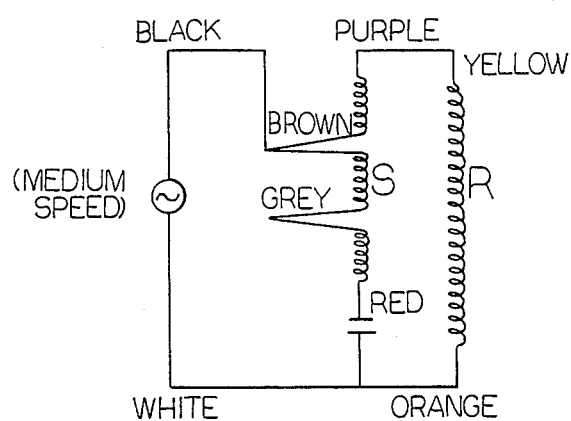
FIG. ID
PRIOR ART

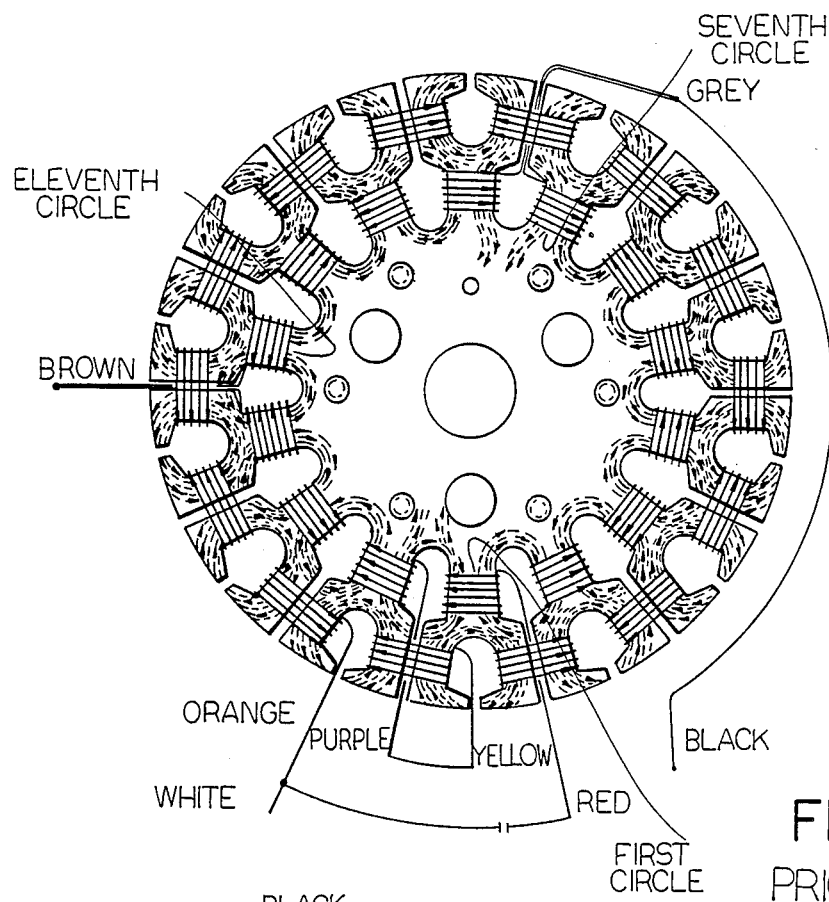
FIG. IE
PRIOR ART
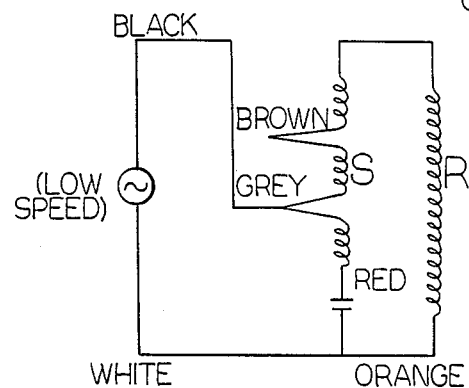
FIG. IF
PRIOR ART

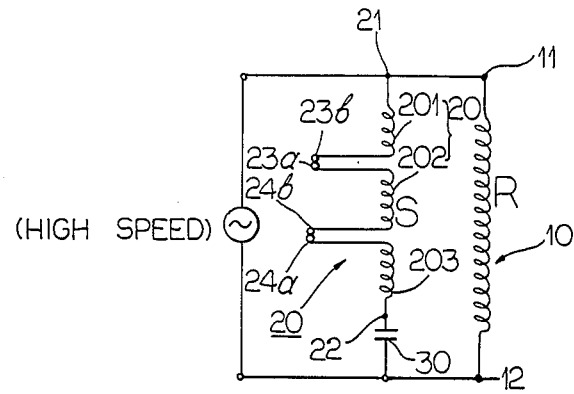
(HIGH SPEED) FIG. 2A
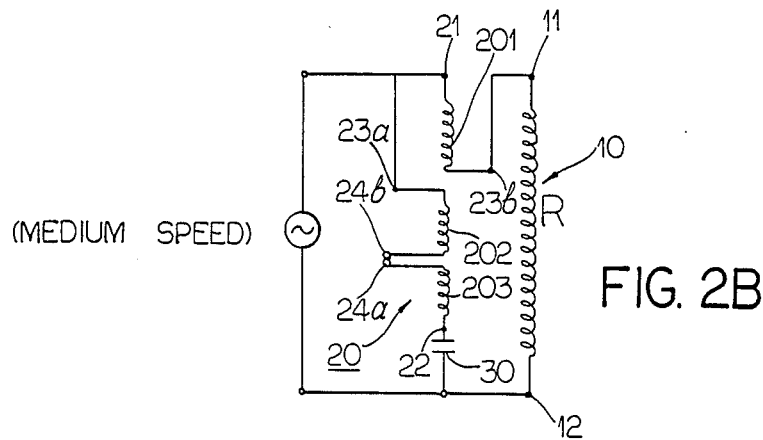
(MEDIUM SPEED) FIG. 2B
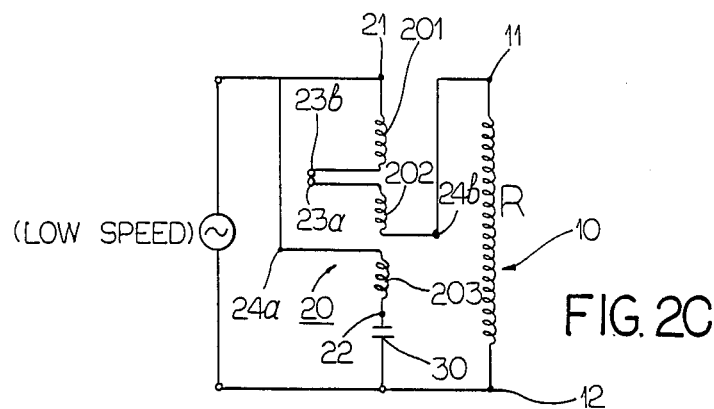
(LOW SPEED) FIG. 2C

SPEED CHANGING DEVICE FOR ELECTRIC FANS

BACKGROUND OF THE INVENTION

This invention relates to a speed-changing device for electric ceiling fans, and more particularly to a tapped coil speed-changing device designed for eliminating the motor noise of an electric ceiling fan during speed change.

Conventionally, speed changing devices for electric ceiling fans are usually classified into two types; capacitor and tapped.

In the capacitor type of speed-changing devices, although no noise of the associated motor is produced during speed change of an electric ceiling fan, the manufacturing cost is very high simply because each speed requires a capacitor of different value. Moreover, the phase angle between the capacitance, resistance and current of the speed changing device is unstable and causes the motor's temperature to rise, which is not satisfactory in practical usage Concerning the known tapped type of speed changing devices, the structure and the speed changing conditions are as shown in FIGS. 1A, 1B, 1C, 1D, 1E and 1F.

Shown in FIGS. 1 A and 1B is a high speed condition of the motor with a tapped type of speed-changing device, wherein the current directions of all the coils are indicated in arrows drawn in accordance with the "left hand rule" (i.e. when the fingers are placed around the coil, the thumb points in the direction of the magnetic north produced in the coil, and the rest of the fingers point in the direction of the current flow). As illustrated in the drawing, when the motor is running at a high speed, the distribution of the magnetic lines in the stator of the motor is uniform and symmetrical; thus, the magnetic effect between the stator and rotator is excellent, and the motor is running in a stable and noiseless condition.

However, as the motor revolution is changed from the high speed to a medium or a low speed, as shown in FIGS. 1C, 1D and 1E, 1F the distribution of the magnetic lines (also drawn on the basis of the "left hand rule") shows that part of the current flow directions are opposite to that of the high speed revolution due to the fact that central taps are made in the coils. As a result, the original uniform and symmetric magnetic lines existing in high speed revolution are suddenly changed to an irregular condition, so that the revolution is not only noisy but also unstable.

SUMMARY OF THE INVENTION

It is accordingly a primary object of this invention to provide a speed changing device for electric ceiling fans that overcomes the problems associated with the prior art.

This and other objects of this invention are achieved by providing a speed changing device for electric ceiling fans, which device comprises a run coil with a pair of terminals, and a starting and speed changing coil matched with a starting capacitor series-connected to the two terminals of the run coil. The starting and speed changing coil includes two terminals and a plurality of predetermined sets of taps, by which the starting and speed changing coil is divided into a plurality of speed-changing coils formed according to the set number of taps plus 1. The configuration of this invention resides in the following features:

When the running motor is changed from high speed to low speed, a predetermined quantity of the speed-changing coils are series-connected to the rotary coil without changing the current flow, and the rest of the speed-changing coils will be parallel-connected to the run coil after the starting capacitor is actuated through the above-mentioned series connection.

Other features and characteristics of this invention will become apparent in the following description of a preferred embodiment of a speed changing device for electric ceiling fans when read in conjunction with the accomanying drawings.

BRIEF DESCRIPTION OF THE DRAWINGS

FIGS. 1A, 1B, 1C, 1D, 1E and 1F are a circuit diagram and magnetic line distribution conditions at various speeds of a known tapped type speed-changing device;

FIG. 2 (A, B, C) is a circuit diagram of a speed changing device according to this invention;

DETAILED DESCRIPTOIN OF THE PREFERRED EMBODIMENT

Figure 3:
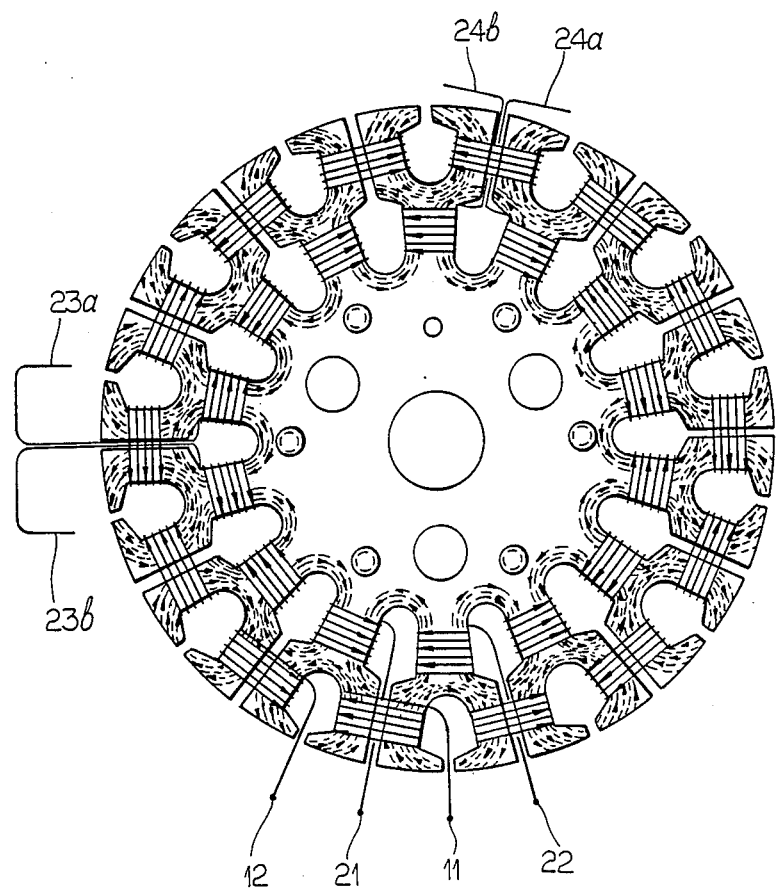
FIG. 3 is an illustrative view of a magnetic line distribution condition according to the circuit diagram of FIG. 2.

Referring to FIGS. 2 (A, B, C) and 3, the preferred embodiment of a speed-changing device for electric ceiling fans according to this invention includes a run coil 10 with two terminals 11 and 12 for being electrically connected to a motor of a ceiling fan, a starting and speed-changing coil 20 with two terminals 21 and 22, and a starting capacitor 30 series-connected at one end to the terminal 22 of the starting and speed changing coil 20.

The starting and speed-changing coil 20 includes a set of medium-speed taps 23a, 23b and a set of low-speed taps 24a, 24b, and is connected, together with the starting capacitor 30, in parallel with terminals 11 and 12 of the run coil 10, and the entire circuit is parallel-connected to a power source as shown in FIG. 1(A), which is used for high-speed revolution. In this configuration, the two medium speed taps 23a, 23b and the two low-speed taps 24a and 24b are respectively connected together, forming three speed-changing coils 201, 202 and 203 in series with the current flow in the three speed-changing coils 201, 202 and 203 being in the same direction. Accordingly the magnetic lines produced therein, shown in FIG. 3, are uniform and regular, not only noiseless but also stable.

As shown in FIGS. 1C and 1D, when the motor revolution is switched into medium speed, the first speed-changing coil 201 remains series connected with the run coil 10 as a portion thereof while the second and third speedchanging coils 202 and 203 are used as starting coils. In this condition, the function of the circuit is the same, in general, as that of the prior art but the taps are different from that of the prior art. The salient feature of this invention is that the connection of the starting and speed-changing coil 20 is changed into a portion of the run coil 10 without incurring any direction change of the flowing current thereof, i.e. the medium-speed tab 23b of the first speed-changing coil 201 is connected to terminal 11 of the rotary coil 10 while the other medium-speed tap 23a is directly connected with the power source. In this configuration, owing to the fact that the current flow direction in the first, second and third speed-changing coils remain unchanged, the directions of the magnetic lines and their distribution conditions are the same as that in the high speed revolution. Therefore, no noise is produced, and the manufacturing cost is not increased.

As shown in FIG. 2(C), when the motor revolution is switched to a low speed, the first and second speed-changing coils 201 and 202 are changed to be in series-connection with the run coil 10, without varying the flow direction of the current while the third speed-changing coil 203 serves as a starting coil of which the current flow direction is also unchanged. Consequently, no noise is produced or increase in cost is realized when the motor revolution is changed.

Having thus described the invention, it is to be understood that many embodiments thereof will suggest themselves without departing from the spirit and scope of the invention. Therefore, it is intended that the specification and drawings be interpreted as illustrative rather than in a limiting sense except as defined in the appended claims.

What is claimed is:

1. A speed changing device for electric ceiling fans, comprising:

a run coil means for being electrically connected to a stator of a ceiling fan;

a starting and speed changing coil means comprising a set of medium-speed taps and a set of low-speed taps arranged so that three speed-changing coils are formed for being variably coupled with said run coil means and parallel-connected to a power source of the ceiling fan for being switched into a plurality of speed-changing coils without incurring direction change of electrical current flowing therein;

wherein a pre-determined number of said speed-changing coils is arranged to be in series-connection with said run coil means while the rest of said speed-changing coils having a capacitor means connected in series at one end thereof, are made to be in parallel-connection with said run coil means after said capacitor means is actuated when the motor revolution is changed into a low speed.

* * * * *